United States Patent
Jo

[11] Patent Number: 6,005,768
[45] Date of Patent: Dec. 21, 1999

[54] NOISE-REDUCING ENCLOSURE FOR A DATA STORAGE DISK DRIVE

[75] Inventor: Whan-Haeng Jo, Seoul, Rep. of Korea

[73] Assignee: SamSung Electronics Co., Ltd., Kyungki-do, Rep. of Korea

[21] Appl. No.: 08/951,642

[22] Filed: Oct. 16, 1997

[30] Foreign Application Priority Data

Oct. 16, 1996 [KR] Rep. of Korea ...................... 96-46294

[51] Int. Cl.⁶ .......................... G11B 33/08; G11B 17/02; H05K 7/14
[52] U.S. Cl. ...................... 361/685; 361/727; 360/97.02; 248/638
[58] Field of Search .................................... 361/683, 685, 361/724, 725, 726, 727; 360/97.02; 248/634, 636, 638

[56] References Cited

U.S. PATENT DOCUMENTS

| | | |
|---|---|---|
| 4,258,821 | 3/1981 | Wendt et al. . |
| 4,713,714 | 12/1987 | Gatti et al. ............................ 360/97.02 |
| 4,834,625 | 5/1989 | Grant . |
| 5,155,662 | 10/1992 | I-Shou ..................................... 361/685 |
| 5,187,643 | 2/1993 | I-Shou . |
| 5,260,851 | 11/1993 | Chiou . |
| 5,282,100 | 1/1994 | Tacklind et al. . |
| 5,331,506 | 7/1994 | Nakajima ................................ 361/683 |
| 5,426,562 | 6/1995 | Morehouse et al. . |
| 5,510,954 | 4/1996 | Wyler . |
| 5,596,483 | 1/1997 | Wyler ..................................... 361/683 |
| 5,666,239 | 9/1997 | Pottebaum .............................. 361/685 |

*Primary Examiner*—Lynn D. Feild
*Assistant Examiner*—John D. Reed
*Attorney, Agent, or Firm*—Robert E. Bushnell, Esq.

[57] ABSTRACT

An enclosure for reducing noise of the data storage read-write device is disclosed. The enclosure preferably contains the hard disk drive. The enclosure includes a flat box type housing 40 having at least one opening and a slit 42 formed along the side faces of the housing 40. Each slit 42 has a predetermined length extending inwardly from the opening and being aligned to face each other. Fitted in the housing 40 is a sound absorption layer 30 surrounding the hard disk drive. This sound absorption layer 30 is formed into a open flat box having a slit 34 formed along the side faces of the sound absorption layer and being aligned with the slit 42 of housing 40. At front periphery of the layer 30 a step portion 36 and a guide groove 38 are formed. A supporting plate 50 is provided for mounting a hard disk drive. The supporting plate 50 is made of a metal sheet and has a bending portion 54 extending from each side thereof. At the bending portion 54 a plurality of mounting holes are provided for mounting the hard disk drive assembly to a bracket or a drive bay of the computer housing. The supporting plate 50 of the invention constitutes a heat conductive path from the hard disk drive 12 to the exterior of the sound absorption layer 30. Furthermore, a cap type front cover 60 is provided to fit in the opening of housing 40. In this arrangement, hard disk drive 12 is first mounted on the supporting plate 50 and then inserted into the sound absorption layer 30 while being inserted through opening 32 and the slits 34. The width of the supporting plate 50 is much larger than that of the opening 32 of the sound absorption layer 30 so that a part of the bottom portion 52 of the supporting plate 52 may extend outwardly from the hard disk drive 12 through the slits 34.

19 Claims, 4 Drawing Sheets

NOISE-REDUCING ENCLOSURE FOR A DATA STORAGE DISK DRIVE

CLAIM OF PRIORITY

This application makes reference to, incorporates the same herein, and claims all benefits accruing under 35 U.S.C. §119 from an application for ENCLOSURE FOR THE DATA STORAGE READ-WRITE DEVICE OR HARD DISK DRIVES earlier filed in the Korean Industrial Property Office on Oct. 16, 1996 and there duly assigned Ser. No. 1996-46294, a copy of which application is annexed hereto.

BACKGROUND OF THE INVENTION

1. Field of the Invention

The present invention relates to noise reduction in computer systems and more particularly, to enclosures for reducing the level of noise emitted by a computer component such as a hard disk drive or other data storage disk drive device.

2. Background of the Invention

As personal computers have proliferated in the work place and home, concern has increased about their effect on the work and home environments. One subject of concern is the effect of noise generated while the computer is in operation. The fans, the disk drives, and the power supply all produce noise during operation. Hard disk drives, in particular, operate at relatively high rotation speeds and produce most of this noise. In addition, current disk drive designs use higher spindle speeds and head actuator speeds to provide faster access times. Such improvements, while enhancing storage capacities and reducing data access times, have resulted in increased acoustic noise. This noise unnecessarily pollutes the office environment. Noise has been associated with increased levels of stress and other physiological effects.

Attempts to reduce acoustic noise generated by hard disk drives have generally followed one of two approaches. An example of the first approach is described in U.S. Pat. No. 5,282,100, issued to Tacklind et al. In the disclosed system a generally flat, box-shaped hard disk drive module has two exterior major surfaces which are acoustically decoupled from the noise generating components of the disk drive device by resilient gaskets. This arrangement somewhat reduces propagation of acoustic noise generated within the module when combined with an insulating film applied to the enclosure surfaces. However, conventional resilient materials for gaskets do not sufficiently attenuate vibrations to provide the full acoustic decoupling needed for a highly effective sound-reducing enclosure.

The second approach uses a sound absorbing material surrounding the drive module to insulate the external environment from the noise generated by the disk drive device. An example of this arrangement appears in U.S. Pat. No. 5,510,954, issued to Wyler. A sound absorbing layer surrounds the disk drive module, and an air-tight enclosure may further surround the sound absorbing layer. This approach utilizes the high sound attenuation properties of various modern insulating materials effectively to prevent disk drive noise from propagating away from the enclosure.

The Wyler device recognizes a substantial problem that arises from enclosing the disk drive in an insulating material, which is that sound insulating materials generally provide heat insulation as well. Heat retention within the disk drive module risks producing a worse problem than noise, because elevated operating temperatures can cause the performance of a disk drive to degrade seriously. To solve this problem, the Wyler device includes a heat sink on an exterior face of the enclosure and a heat conductive path from the heat sink through the sound absorbing layer to the disk drive device. The proximal end of the heat path connects to a metal bracket that partially surrounds the drive module and thereby acts as both an additional layer of sound insulation and as a cold plate.

The Wyler arrangement effectively reduces the noise emitted from the disk drive enclosure, but it also has several limitations. First, the heat sink must be separately mounted externally relative to the sound absorbing layer. Also, the device works best when the heat conducting path consists of copper braiding or another metal with relatively high thermal conductivity. This requirement arises from the fact that the heat conducting path joins both the heat sink and the "cold plate" metal bracket, respectively, in relatively small areas. Sufficiently rapid heat transfer therefore requires that the heat conducting path consist of a conductivity-optimized material, such as pure copper.

For greatest effectiveness, the heat conducting path must also join the heat sink and the metal bracket with metal-to-metal contact, such as by bolting or soldering. The joints therefore require separate attachment operations during manufacture of the device, and these operations must comply with high quality control standards to ensure that a faulty heat channel does not cause the disk drive to overheat. Such requirements do not diminish the value of the device once fabricated, but they do increase the cost of fabrication. Manufacture of the Wyler enclosure may also be complicated by its modular construction from discrete insulating panels, which increases the costs of assembly even further.

Another serious limitation of the Wyler device arises from the fact that it structurally isolates the disk drive module from system chassis to which the enclosure is attached. The module has no positive attachment to the chassis, but instead is supported on all sides by resilient insulating material. Such isolation enhances the enclosure's noise-confining performance, but it does so at the risk of allowing the drive module to become mobile within the insulating layer. If any part of the layer becomes compressed, due to forces from the module itself in response to shocks, for example, then the module will freely float in a cavity. The cavity will likely enlarge rapidly as the module progressively develops more and more momentum in response to shocks to the enclosure. The reliable lifespan of the enclosure is therefore uncertain at best, and the first indication of its failure will likely be a catastrophic failure of the disk drive device.

I have noticed, therefore, that a continuing and unmet need exists for a noise reducing disk drive enclosure that effectively combines the advantages of acoustically decoupled systems and sound absorption systems. Such an enclosure should provide both the positive structural support of acoustically decoupled systems and the effective noise attenuation of sound absorption systems. It should also address the heat build-up problem inherent in the use of insulating materials. Preferably, such a system would conform to existing disk drive configurations. Ideally, it would utilize conventional materials available at low cost and could be implemented with simple manufacturing operations.

SUMMARY OF THE INVENTION

It is therefore an object of the invention to provide an acoustically shielded hard disk assembly which is simple in construction.

It is another object of the invention to provide an enclosure for the hard disk drive that is simpler to assemble and to install in the computer.

In accordance with a first aspect of the present invention, an enclosure for reducing noise of the data storage read-write device comprises a supporting plate mounting the data storage read-write device thereon; a sound absorption layer formed into an open flat box and having a slit formed along opposite side faces thereof so that the data storage read-write device is inserted and the supporting plate passes along the slits; and a housing having an opening and a slit formed along the side faces thereof, wherein the slit is aligned with the slit of the sound absorption layer so as to receive the hard disk drive along the opening and to pass the side parts of the supporting plate along the slit.

Further, the enclosure further includes a cover for blocking the opening of the housing, wherein at the front surface thereof a hole is formed to be aligned with the cable connectors of the hard disk drive and at rear end of the cover a hook piece is formed to be fit with a hook eye formed at side faces of the housing.

Preferably, the supporting plate is made of a metal sheet and having a bending portion extended from each side thereof, and wherein the width of the supporting plate is much larger than that of the opening of the sound absorption layer so that a part of the bottom portion of the supporting plate is extended outwardly from the hard disk drive through the slits. Also, the bending portion is provided with a plurality of holes for mounting the data storage read-write device to a bracket or a drive bay of the computer housing.

In the preferred embodiment of the invention, data storage read-write device includes a hard disk drive, and the supporting plate constitutes a heat conductive path from the data storage read-write device to the exterior of the sound absorption layer. At front periphery of the sound absorption layer a step portion is formed so as to fit the periphery of the cover into the housing.

In accordance with a second aspect, the present invention provides a noise-reducing enclosure for blocking disk drive-generated noise, comprising: a mounting member adapted to be attached to a disk drive module and including an extending portion; a layer of sound absorbing material substantially surrounding the module and defining a first aperture for receiving the extending portion therethrough; and a housing having a pair of opposed sides and defining a front opening for receiving the module and the layer surrounding the module, with at least one of the sides defining a second aperture aligned with the first aperture and being adapted to receive the extending portion therethrough.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein.

DETAILED DESCRIPTION OF THE PREFERRED EMBODIMENTS

Figure 1:
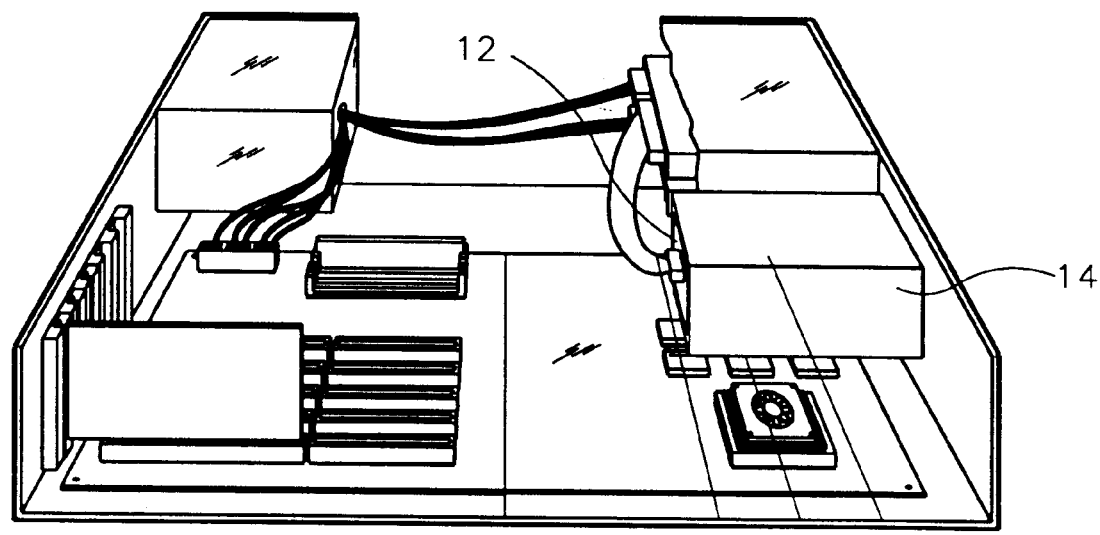
FIG. 1 is an illustration of a conventional personal computer with the top lid removed.

As shown in FIG. 1, a hard disk drive 12 is typically mounted in a drive bay 14 of a personal computer 10. Since hard disk drive 12 is directly mounted to drive bay 14 of the computer housing, noise and vibration propagate through the side faces and top lid (not shown) to the environment external to computer 10.

Figure 2:
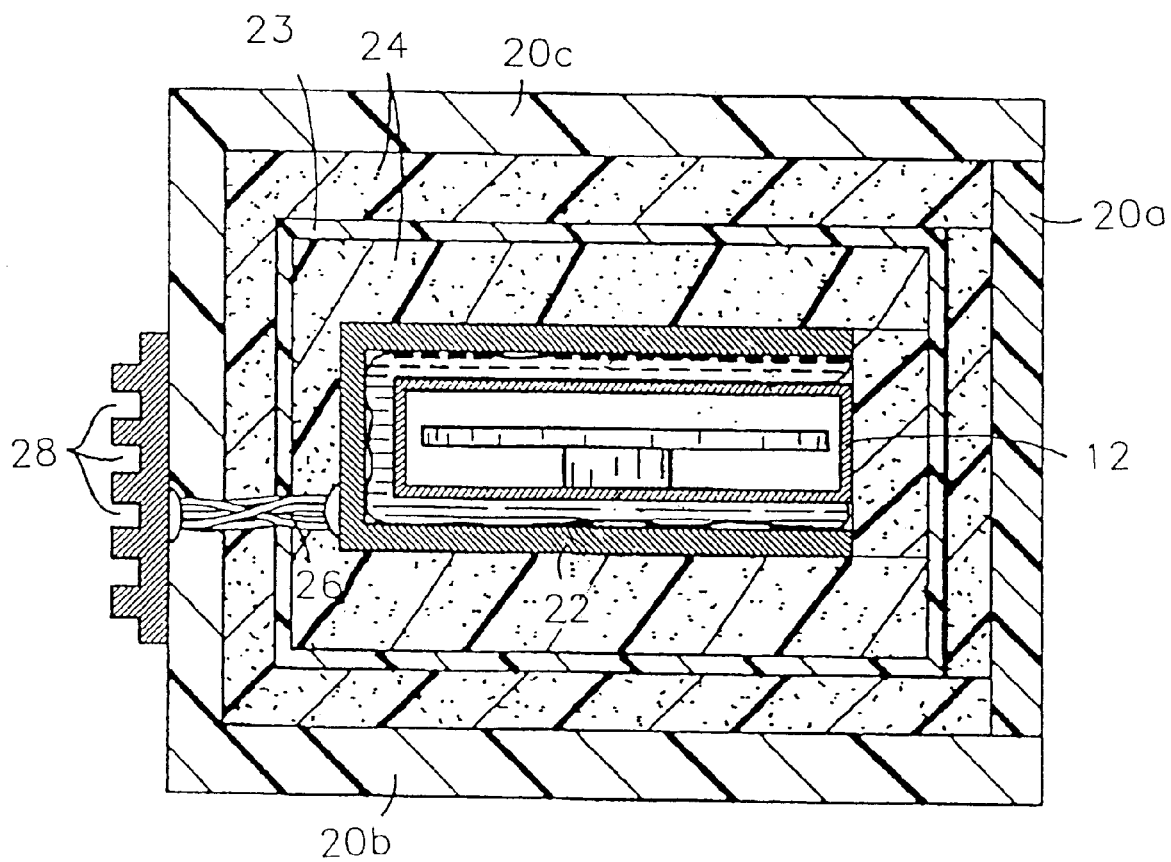
FIG. 2 is a cross-sectional view for showing structure of a prior art silent disk drive assembly.

The Wyler arrangement of U.S. Pat. No. 5,510,954 is shown in FIG. 2. A sound absorption layer 24 surrounds hard disk drive 12 and is further surrounded with an air-tight enclosure 20. A heat sink 28 is mounted onto a side face of enclosure 20. A heat conductive path 26 is provided from heat sink 28 through an insulating layer 24 so that heat may be conducted away from hard disk 12. Further, a metal bracket 22 is arranged to hold hard disk 12 and to make a contact with heat conductive path 26.

Figure 3:
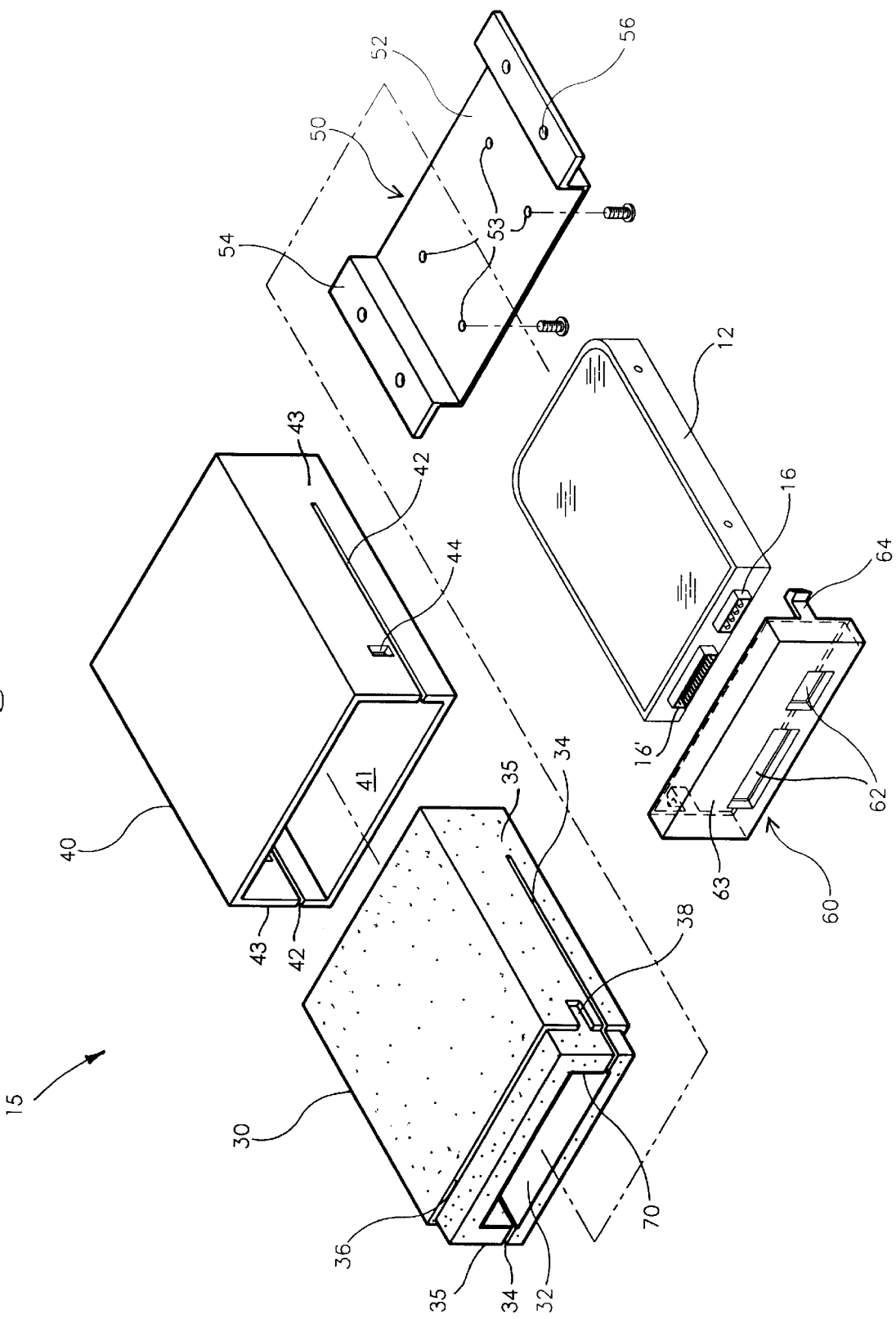
FIG. 3 is an exploded view of an acoustically shielded hard disk drive assembly in accordance with the present invention.
Figure 4:
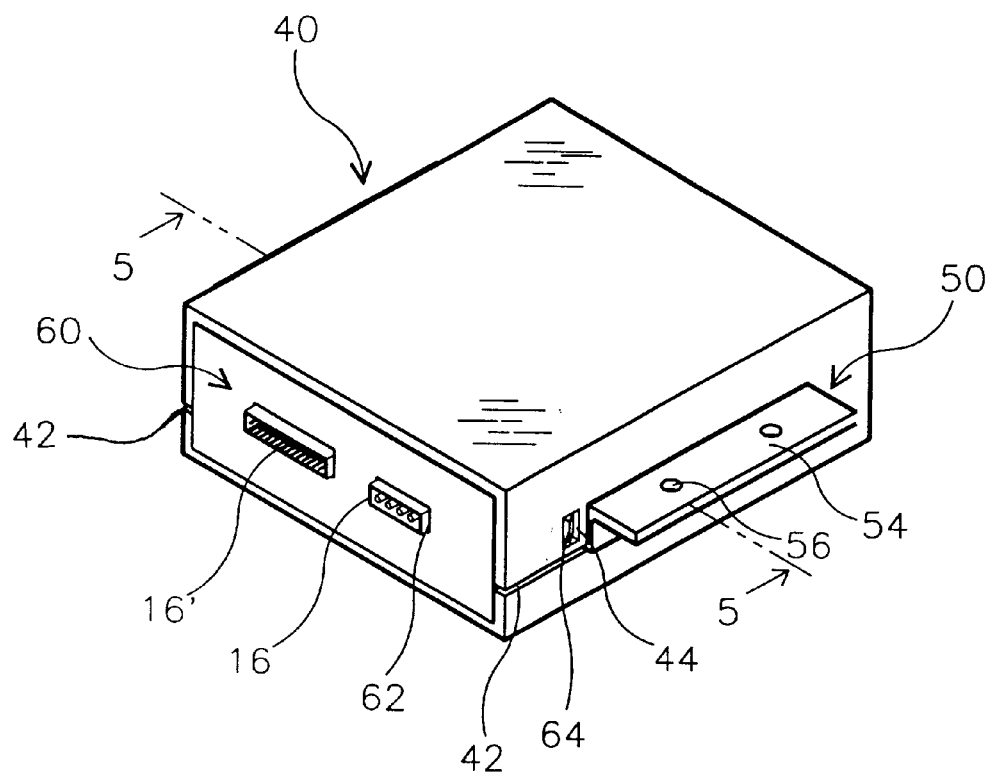
FIG. 4 is an isometric view of the hard disk drive assembly of the present invention.

FIGS. 3 and 4 show an acoustically shielded hard disk drive enclosure 15 constructed in accordance with the present invention. Enclosure 15 includes a box shaped housing 40 having at least one opening 41 and slits 42 formed along parallel side faces 43 of housing 40. Each slit 42 has a predetermined length and extends inwardly from opening 41 and is aligned parallel to and at the same level as the other slit 42. A hook eye 44 is formed near the end of each side face 43 adjacent opening 41.

Fitted into housing 40 is a sound absorption layer 30 surrounding hard disk drive 12. Sound absorption layer 30 is formed into a hollow flat box shape having a front opening 32 and a slit 34 formed along each one of two opposing side faces 35 of sound absorption layer 30. Also, slits 34 are arranged to align with slits 42 of housing 40. At the periphery of layer 30 adjacent opening 32, a step portion 36 and a guide groove 38 are formed. Sound absorption layer 30 comprises a sound absorptive porous material such as STYROFOAM™, which is one brand of expanded polystyrene resin.

A supporting plate 50 is provided for mounting hard disk drive 12 to a chassis, or a fixed structure, of a computer system. Supporting plate 50 is made of a metal sheet and has a bending portion 54 extended from each side thereof. At a bottom portion 52 of plate 50, several mounting holes 53, for example, four holes 53, are formed to fix hard disk drive 12 onto supporting plate 50 by means of screws inserted from the underside of plate 50. Also, at bending portion 54 a plurality of mounting holes 56 are provided for mounting enclosure 15 into a drive bay (not shown) or onto a bracket of the computer chassis (not shown). In addition, supporting plate 50 constitutes a heat conductive path from hard disk drive 12 to the exterior of sound absorption layer 30, as will be described below.

Enclosure 15 also includes a cap type front cover 60 that fits into opening 41 of housing 40. Front cover 60 has holes 62 at a front surface 63 thereof, and holes 62 are formed to align with connectors 16, 16' of hard disk drive 12. In addition, at an end of cover 60 opposite front face 63, front cover 60 has at either side a hook piece 64 formed to fit within hook eye 44 of housing 40.

In the above arrangement, housing 40 containing hard disk drive 12 is made of a flexible plastic that resists propagation of noise-generating vibrations. Hard disk drive 12 is first mounted on supporting plate 50. The plate-disk drive combination is then inserted into sound absorption layer 30 through opening 32, with bending portions 54 sliding into slits 34. Opening 32 has dimensions slight larger than those of disk drive 12, and the width of slits 34 formed along the side faces of the sound absorption layer 30 is the same as or slightly larger than the thickness of supporting plate 50.

Figure 5:
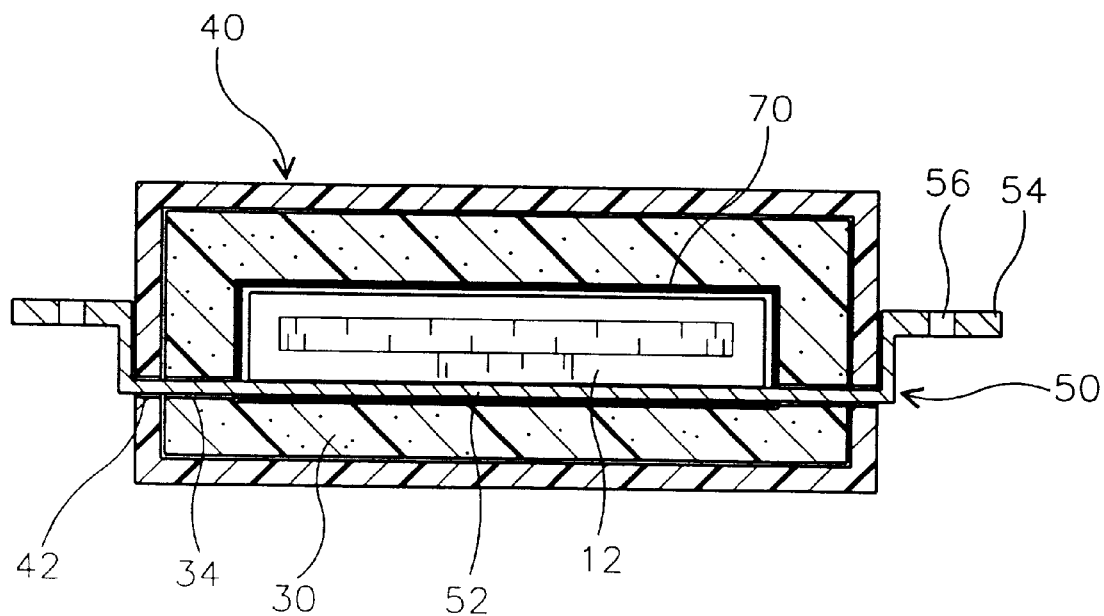
FIG. 5 is a cross-sectional view of FIG. 4 taken along line A—A.

FIG. 5 illustrates that the width of supporting plate 50 is substantially larger than that of opening 32 of sound absorption layer 30. Preferably, a metal layer 70 made of antistatic material is coated onto the interior surface of sound absorption layer 30. Thus, a part of bottom portion 52 as well as bending portions 54 of supporting plate 50 extend outwardly from the bottom side of hard disk drive 12 through slits 34.

Furthermore, as opening 41 of housing 40 is slight larger than the outer dimensions of sound absorption layer 30, and slits 42 of the enclosure are located at the same level as slits 34 formed in sides 35 of sound absorption layer 30, the box-like configuration of sound absorption layer 30 can be slidably inserted into housing 40 parallel to slits 42. In this arrangement, a part of bottom portion 52 of supporting plate 50 still extends outwardly.

Finally, front cover 60 is fitted into a gap (not shown) between the inner wall of housing 40 and step portion 36 formed at the front periphery of sound absorption layer 30. As front cover 60 is inserted into the gap along guide groove 38, the protrusion of hook pieces 64 at the rear sides of front cover 60 become engaged with hook eyes 44 of housing 40. Also, cable connectors 16, 16' of hard disk drive 12 are fitted into holes 62 of front cover 60. This operation effects a rigid coupling of front cover 60 with housing 40. At this point housing 40 is preferably rendered air-tight, to minimize the passage of sound from within, by applying a sealant about the periphery of the front cover 60 and the slits 42 of housing 40.

As apparent from foregoing, the acoustically shielded hard disk drive enclosure of the present invention provides for a simplification of construction and for ease of assembly of disk drive enclosure. Moreover, supporting plate 50 according to this invention functions as a heat sink when it is mounted to a metal bracket or bay of the computer housing, and it also provides a stable mounting for hard disk drive 12. This arrangement eliminates the need for a separate heat sink and a heat conductive path, which reduces manufacturing costs, and it provides a more reliable restraint of disk drive 12 within enclosure 15.

While the present invention has been described in terms of an exemplary embodiment, it is contemplated that it may be practiced as outlined above or with modifications and yet remain within the spirit and scope of the appended claims.

What is claimed is:

1. An enclosure for reducing noise of a data storage disk drive device, comprising:
    a supporting plate for mounting said data storage disk drive device thereon;
    a sound absorption layer formed into an open flat box having opposed side faces and having a slit formed in a front portion of each one of said side faces, whereby so that the data storage read-write device is inserted and the supporting plate passes along the slits; and
    a housing having an opening and a slit formed along the side faces thereof, wherein the slit is aligned with the slit of the sound absorption layer so as to receive the hard disk drive along the opening and to pass the side parts of the supporting plate along the slit.

2. The enclosure as claimed in claim 1, further comprising a cover for blocking said opening, wherein at the front surface thereof a hole is formed to be aligned with the cable connectors of the hard disk drive and at rear end of the cover a hook piece is formed to be fit with a hook eye formed at side faces of the housing.

3. The enclosure as claimed in claim 1, further comprising a metal layer coated on the inner wall of the sound absorption layer.

4. The enclosure as claimed in claim 1, wherein the supporting plate is made of a metal sheet and having a bending portion extended from each side thereof, and wherein the width of the supporting plate is much larger than that of the opening of the sound absorption layer so that a part of the bottom portion of the supporting plate is extended outwardly from the hard disk drive through the slits.

5. The enclosure as claimed in claim 4, wherein the bending portion is provided with a plurality of holes for mounting the data storage read-write device to a bracket or a drive bay of the computer housing.

6. The enclosure as claimed in claim 1, wherein the data storage read-write device includes a hard disk drive.

7. The enclosure as claimed in claim 1, wherein the supporting plate constitutes a heat conductive path from the data storage read-write device to the exterior of the sound absorption layer.

8. The enclosure as claimed in claim 1, wherein at front periphery of the sound absorption layer a step portion is formed so as to fit the periphery of the cover into the housing.

9. The enclosure as claimed in claim 1, wherein the sound absorption layer is made of a sound absorptive porous material.

10. A noise-reducing enclosure for blocking disk drive-generated noise, comprising:
    a disk drive module;
    a mounting member adapted to be attached to said disk drive module and including an extending portion;
    a layer of sound absorbing material formed into an open box substantially surrounding said disk drive module and having opposed side faces, wherein a first aperture is formed in each of said opposed side faces for receiving said extending portion therethrough; and
    a housing having a pair of opposed sides and defining a front opening for receiving said disk drive module and said layer surrounding said disk drive module, with at least one of said opposed sides of said housing defining a second aperture aligned with one of said first apertures and being adapted to receive said extending portion therethrough;
    said extending portion transmitting heat from said disk drive module to outside of said housing and allowing said disk drive module to be mounted to a fixed structure.

11. The enclosure of claim 10, wherein said mounting member comprises a metal alloy.

12. The enclosure of claim 11, wherein said disk drive module has a predetermined width and a predetermined length, said mounting member is a supporting plate having a bottom portion configured for mounting said disk drive module thereto, and said extending portion is a substantially flat plate extending longitudinally for a first dimension equal to a substantial portion of said length and laterally for a second dimension sufficient to mount said supporting plate to a bracket within a disk drive bay of a computer chassis.

13. A noise reducing enclosure for a device that generates noise and heat, comprising:
- a device;
- a mounting member attached to said device and having an extending portion;
- a layer of sound absorbing material formed into an open box substantially surrounding said device and having opposed side faces, wherein a first aperture is formed in each of said opposed side faces for receiving said extending portion; and
- a housing having a front opening for receiving said device and said layer surrounding said device, said housing having opposing sides, each having a second aperture formed therein, said second aperture being aligned with said first aperture so that said extending portion passes through said first and second apertures to project outside of said housing;
- said extending portion transmitting heat from said device to outside of said housing and allowing said device to be mounted to a fixed structure.

14. The noise reducing enclosure of claim 13, wherein said mounting member comprises a metal alloy.

15. The noise reducing enclosure of claim 13, wherein said device has a side engaged with said mounting member.

16. The noise reducing enclosure of claim 15, wherein said extending portion is a flange bearing a bore that can be fastened to said fixed structure.

17. The noise reducing enclosure of claim 16, wherein said device is a peripheral device for a computer system.

18. The noise reducing enclosure of claim 17, wherein said device is a disk drive module.

19. The noise reducing enclosure of claim 18, wherein said fixed structure is a bay in a computer housing.

* * * * *